US011761214B2

(12) United States Patent
Thomas (10) Patent No.: US 11,761,214 B2
(45) Date of Patent: Sep. 19, 2023

(54) FLOORING ELEMENT (71) Applicant: Cap Trac Ltd, Norwich (GB)

(72) Inventor: Richard Thomas, Norwich (GB)

(73) Assignee: CAP TRAC LTD, Norwich (GB)

( * ) Notice: Subject to any disclaimer, the term of this patent is extended or adjusted under 35 U.S.C. 154(b) by 0 days.

(21) Appl. No.: 17/499,767

(22) Filed: Oct. 12, 2021

(65) Prior Publication Data

US 2022/0112725 A1 Apr. 14, 2022

(30) Foreign Application Priority Data

Oct. 12, 2020 (GB) ..................................... 2016178

(51) Int. Cl.
| | | |
|---|---|---|
| *E04F 15/02* | (2006.01) | |
| *E01C 5/00* | (2006.01) | |
| *E01C 5/20* | (2006.01) | |
| *E04F 15/10* | (2006.01) | |
| *F16B 21/02* | (2006.01) | |
| *E01C 9/08* | (2006.01) | |

(52) U.S. Cl.
CPC ........ *E04F 15/02005* (2013.01); *E01C 5/001* (2013.01); *E01C 5/003* (2013.01); *E01C 5/005* (2013.01); *E01C 5/20* (2013.01); *E01C 9/086* (2013.01); *E04F 15/02011* (2013.01); *E04F 15/02172* (2013.01); *E04F 15/02183* (2013.01); *E04F 15/105* (2013.01); *F16B 21/02* (2013.01); *E01C 2201/12* (2013.01); *E01C 2201/14* (2013.01); *E04F 2201/0107* (2013.01)

(58) Field of Classification Search
CPC .......... E04F 15/02005; E04F 15/02172; E04F 15/02183; E04F 15/105; E04F 2201/0107; E01C 5/005; E01C 2201/14
USPC .................................. 52/588.1, 582.2, 590.1
See application file for complete search history.

(56) References Cited

U.S. PATENT DOCUMENTS

| | | |
|---|---|---|
| 1,150,044 A | 8/1915 | Leonard |
| 1,682,210 A | 8/1928 | Belrose |
| 1,710,610 A | 4/1929 | Duke |

(Continued)

FOREIGN PATENT DOCUMENTS

| | | |
|---|---|---|
| CA | 2843068 A1 | 8/2014 |
| CH | S81644 A5 | 4/1993 |

(Continued)

*Primary Examiner* — Brent W Herring
(74) *Attorney, Agent, or Firm* — Stoel Rives LLP (57) ABSTRACT

A flooring element suitable for connection to other elements in a flooring system. The flooring element comprises a body, a female connector and a retainer. The body defines a connector surface that is horizontal when in use. The female connector comprises a connector recess which is suitable for receiving a male connector and also which defines a connector opening in the connector surface. The retainer is connectable to the body such that, while it is connected to the body, the retainer is movable between and open position and a closed position. When in the closed position, the retainer is arranged to restrict movement of the male connector to guard against the male connector exiting the connector recess through the connector opening. When in the open position, the retainer does not restrict movement of the male connector thereby permitting the male connector to exit the connector recess through the connector opening.

20 Claims, 6 Drawing Sheets

(56) References Cited

U.S. PATENT DOCUMENTS

| | | | |
|---|---|---|---|
| 1,807,630 A | 6/1931 | McFarlin | |
| 1,918,228 A | 7/1933 | Spencer | |
| 2,136,431 A | 11/1938 | Gardaile | |
| 2,822,585 A | 2/1958 | Baruch | |
| 2,829,018 A | 4/1958 | Valtri | |
| 3,141,392 A | 7/1964 | Schneider et al. | |
| 3,780,480 A | 12/1973 | Cvijanovic et al. | |
| 4,538,392 A | 9/1985 | Hamar et al. | |
| 5,323,575 A | 6/1994 | Yeh | |
| 5,899,038 A | 5/1999 | Stroppiana | |
| 6,032,425 A | 3/2000 | Gugliotti et al. | |
| 6,032,427 A | 3/2000 | Randjelovic | |
| 6,468,616 B1 | 10/2002 | Bristow | |
| 6,575,660 B1 | 6/2003 | Davis et al. | |
| 6,694,691 B2 | 2/2004 | Ku | |
| 6,851,236 B1 | 2/2005 | Harvey | |
| 7,162,838 B2 | 1/2007 | Ardern | |
| 8,146,317 B1 | 4/2012 | Fletcher et al. | |
| D667,144 S * | 9/2012 | Else | E01C 5/005 |
| | | | D25/163 |
| 8,291,661 B2 | 10/2012 | Bengry et al. | |
| 8,631,624 B2 | 1/2014 | McIntosh et al. | |
| 8,850,753 B2 | 10/2014 | Tabibnia | |
| 9,038,341 B2 | 5/2015 | Lam et al. | |
| 9,302,851 B2 * | 4/2016 | Esser | B65G 13/11 |
| 9,416,548 B2 | 8/2016 | Tang | |
| 9,982,439 B2 | 5/2018 | Essig | |
| 10,071,796 B2 * | 9/2018 | Esser | B64D 9/00 |
| 10,113,320 B1 | 10/2018 | Cataldi et al. | |
| 10,697,130 B2 * | 6/2020 | Jones | E01C 11/222 |
| 10,815,028 B1 * | 10/2020 | Turner | E01C 5/005 |
| 2003/0041542 A1 | 3/2003 | Martin | |
| 2003/0136070 A1 | 7/2003 | Ku | |
| 2004/0005430 A1 * | 1/2004 | Rogers | E01C 5/005 |
| | | | 428/44 |
| 2005/0072094 A1 | 4/2005 | Ardern | |
| 2005/0193675 A1 | 9/2005 | Smart et al. | |
| 2005/0214077 A1 | 9/2005 | DeArmond, Jr. | |
| 2007/0094969 A1 | 5/2007 | McIntosh et al. | |
| 2009/0139159 A1 | 6/2009 | Hill | |
| 2010/0257801 A1 | 10/2010 | Anderson | |
| 2010/0313509 A1 | 12/2010 | McIntosh et al. | |
| 2011/0120037 A1 | 5/2011 | Barlow | |
| 2012/0266549 A1 | 10/2012 | Rosan | |
| 2014/0202824 A1 * | 7/2014 | Esser | B64D 9/003 |
| | | | 248/503 |
| 2016/0214703 A1 * | 7/2016 | Esser | B65G 39/12 |
| 2017/0260699 A1 | 9/2017 | Tabibnia | |
| 2017/0260754 A1 | 9/2017 | Kugler et al. | |
| 2018/0030667 A1 * | 2/2018 | Penland, Jr. | B32B 3/06 |
| 2018/0094442 A1 | 4/2018 | Barlow | |
| 2019/0211514 A1 | 7/2019 | Jones et al. | |
| 2021/0088061 A1 * | 3/2021 | Jones | F16B 5/0621 |

FOREIGN PATENT DOCUMENTS

| | | |
|---|---|---|
| CN | 209759928 U | 12/2019 |
| FR | 2487407 A2 | 1/1982 |
| GB | 902259 A | 8/1962 |
| JP | H0551992 A | 3/1993 |
| KR | 101829809 B1 | 3/2018 |
| WO | 2018022860 A1 | 2/2018 |

* cited by examiner

FLOORING ELEMENT

FIELD OF THE INVENTION

The invention relates to a flooring element for connection to other elements in a flooring system, to a flooring system comprising such elements, and to a method of installing the flooring system.

INTRODUCTION

Modular flooring systems are frequently used in indoor and outdoor applications where a durable ground covering is temporarily required to provide a surface suitable for vehicles and/or pedestrians. Examples of such applications include temporary hard standings, site compounds, walkways and roadways.

Such modular flooring systems are typically comprised of multiple small flooring elements or panels which interconnect at the edges to create a larger flooring surface. With many elements making up a large flooring area, it is important that the modular flooring system is quick and easy to install, with as little time as possible required to install and secure each individual element. As such, various known approaches make use of snap fit connection types which allow individual panels to be clipped together without the need for separate fastening hardware such as nuts, bolts and screws. These connection types generally comprise a female connector on one panel and a corresponding male connector on the adjacently connected panel.

Approaches are known in which a tongue and groove connection arrangement allows for a male 'tongue' connector on the edge of one panel to be received into a corresponding female 'groove' connector on the edge of an adjacent panel by laterally sliding the panels together, in the plane of the floor surface. Installing modular flooring systems with tongue and groove connection types can be difficult and time consuming because the lateral engagement means that individual panels must be connected together sequentially. Furthermore, it is difficult to replace a single defective panel in such an arrangement.

Other known approaches attempt to overcome these shortcomings by providing a connection type between panels which allows for a male connector on one panel to be received from above into a corresponding female connector on an adjacent panel. However, floor panels connected together using these approaches are susceptible to becoming disconnected when a load is applied to the flooring surface which forces the panels vertically apart. This is especially problematic when the modular flooring system is laid over an uneven ground surface.

In order to prevent such separation, known approaches make use of secondary locking covers which are subsequently fitted over the mated connectors to secure them in place. Such covers are separate components which are fitted after panels have been connected together. The use of such covers, therefore, complicates and slows down the installation of such modular flooring systems.

It is against this background that the invention has been devised.

SUMMARY OF THE INVENTION

According to a first aspect of the present disclosure, a flooring element is suitable for connection to other elements in a flooring system. The flooring element comprises a body, a female connector and a retainer. The body defines a connector surface that is horizontal when in use. The female connector comprises a connector recess which is suitable for receiving a male connector and also which defines a connector opening in the connector surface. The retainer is connectable to the body such that, while it is connected to the body, the retainer is movable between and open position and a closed position. When in the closed position, the retainer is arranged to restrict movement of the male connector to guard against the male connector exiting the connector recess through the connector opening. When in the open position, the retainer does not restrict movement of the male connector thereby permitting the male connector to enter and/or exit the connector recess through the connector opening.

By virtue of the retainer, the male connector can be quickly and easily secured in the female connector. Because the retainer can be connected to the body in both the open and close positions, the retainer can be pre-installed and left in place while the flooring element is stored between uses. Thus, when installing the flooring element in a flooring system, there is no need for a user to install a separate part, because the retainer can already be provided in place. The retainer can be quickly and easily moved between the open and closed positions to allow the user to install and disassemble the flooring system with ease.

The connector surface may define a horizontal plane wherein the retainer is configured to move between the open and closed positions in a movement plane that is substantially horizontal to the horizontal plane.

The connector recess may comprise a connector latch. The connector latch is suitable for engaging with the male connector to prevent the male connector from exiting the connector recess through the connector opening. In these embodiments, the retainer is configured to restrict movement of the connector latch when the retainer is in the closed position so as to prevent the male connector from disengaging from the connector latch, thereby limiting movement of the male connector.

According to some embodiments, the retainer may be configured to move between the open and closed positions by rotation about a rotation axis perpendicular to the horizontal plane. Also, the retainer may comprise a body connection portion for connecting the retainer to the body which, optionally, comprises a cam centred on the rotation axis.

The cam may define a blocking element that restricts movement of the connector latch when the retainer is in the closed position. The cam may be shaped such that it is configured to be positioned to be adjacent to the connector latch when the retainer is in the closed position and spaced apart from the connector latch when the retainer is in the open position. Optionally, the cam is also configured to push on the connector latch when the retainer is in the closed position.

The cam may comprise a wall having an arcuate portion that defines the blocking element and a linear portion that truncates the arcuate portion. The linear portion is arranged such that it lies adjacent to the connector latch when the retainer is in the open position and the arcuate portion is arranged such that it lies adjacent to the connector latch when the retainer is in the closed position.

According to some embodiments, the retainer may comprise a tool engaging feature which is suitable for engaging a tool to facilitate movement of the retainer between the open and closed positions.

According to some embodiments, the body connection portion of the retainer may comprise engagement means which are configured to engage a corresponding engagement means on the body when the body and the retainer are connected. The engagement means on the body connection portion may comprise a latch which defines a detent suitable for engaging with a corresponding protrusion comprised on the engagement means on the body. Optionally, the engagement means on the body connection portion comprises a latch arranged at an end of an elongate portion.

The body may comprise first and second engagement means which are suitable for engaging with the engagement means on the body connection portion of the retainer, wherein the first engagement means is suitable for securing the retainer in the open position and the second engagement means is suitable for securing the retainer in the closed position.

The first and second engagement means may be circumferentially displaced about the rotation axis, and optionally by approximately 90 degrees.

According to embodiments comprising engagement means, the body of the flooring element may comprise a retainer opening through which the engagement means of the body connection portion of the retainer extend to reach the corresponding engagement means of the body. Such a retainer opening may be a least partially surrounded by an inwardly-projecting flange that is inset from the floor surface to define a shoulder region which is shaped to accommodate the collar when the retainer is connected to the body.

The engagement means of the body may be provided on such a flange, and optionally on an underside of the flange facing away from the shoulder region.

A notch, optionally with a ramped surface, may be comprised on an edge of the flange adjacent to the retainer opening. Such a notch is configured to facilitate passage of the engagement feature of the body connection portion over the flange as the retainer is connected to the body and may be positioned such that the retainer is in the open position when the engagement feature of the body connection portion is aligned with the notch.

According to some embodiments, the retainer may comprise an obstruction portion which is configured to obstruct the connector opening when the retainer is in the closed position so as to restrict movement of the male connector, and also so that it does not obstruct the connector recess or restrict movement of the male connector when the retainer is in the open position.

In such embodiments, the retainer may comprise a plate which has a root portion and projecting portion, wherein the projecting portion defines the obstruction portion of the retainer. Optionally, the body connection portion depends downwardly from the root portion when the retainer is connected to the to the body when the flooring element is arranged for use. When the retainer comprises an obstruction portion, the body may comprise a recessed region which accommodates the obstruction portion of the retainer when the retainer is in both the closed and open positions. In this way the plate is substantially flush with the connector surface when the retainer is connected to the body and the flooring element is arranged for use. Optionally, the recessed region defines a path for the obstruction portion between the open and closed positions. The recessed region may have a footprint, and the shape of the footprint may correspond to a sweep of the footprint of the obstruction portion between the open and closed positions.

According to some embodiments, the flooring element may comprise a male connector which is configured to be suitable for connection to a female connector of an identical flooring element. Such male connector may be configured to fit through the connector opening to be received in the connector recess.

The connector surface may be a floor surface that is configured to face upwards during use of the flooring element.

The connector may be connected to the body, optionally removably connected to the body.

The invention also encompasses a flooring system which comprises a plurality of flooring elements according to the first aspect or any embodiments thereof as described above.

According to another aspect, there is provided a method of installing a flooring system that comprises a first flooring element and a second flooring element. The first flooring element has a male connector, and the second flooring element has a body which defines a connector surface, a retainer which is connected to the body, and a female connector formed in the body. The female connector comprises a connector recess which is suitable for receiving the male connector and which defines a connector opening in the connector surface. The method of installing the flooring system comprises having the retainer in an open position and lowering the male connector into the recess of the female connector through the opening. When the retainer is in an open position, movement of the male connector is not restrained by the retainer. The method further comprises moving the retainer from the open position to a closed position to guard against the male connector exiting the recess via the opening. When the retainer is in a closed position, movement of the male connector is restrained by the retainer.

In a further aspect the invention resides in another flooring element for connection to other elements in a flooring system. The flooring element comprises a body defining a connector surface that is horizontal when in use and a female connector. The female connector comprises a connector recess suitable for receiving a male connector, the connector recess defining a connector opening in the connector surface, and a connector latch configured to engage the male connector when the male connector is received in the connector recess to prevent the male connector exiting the connector recess through the connector opening. The connector latch comprises a cap and a stem that joins a base of the recess to the cap, The stem comprises a front surface that faces towards the recess. The front surface is shaped such that, when the male connector is arranged in the recess and engaged with the connector latch, an upper region of the front surface adjacent to the cap is closer to the male connector than a lower region of the front surface that is adjacent to the base.

For example, the front surface may be sloped between the base and the cap.

The stem may comprise a thicker region adjacent to the base and a thinner region adjacent to the cap.

Preferred and optional features of any aspect of the invention may be used alone or in appropriate combination with other aspects of the invention also. In particular, features described in relation to the flooring element or flooring system may apply to the method of installing the flooring element in the flooring system.

BRIEF DESCRIPTION OF THE FIGURES

By way of example only, the invention will now be described with reference to the accompanying drawings, in which.

DESCRIPTION OF SPECIFIC EMBODIMENTS OF THE INVENTION

Figure 1:
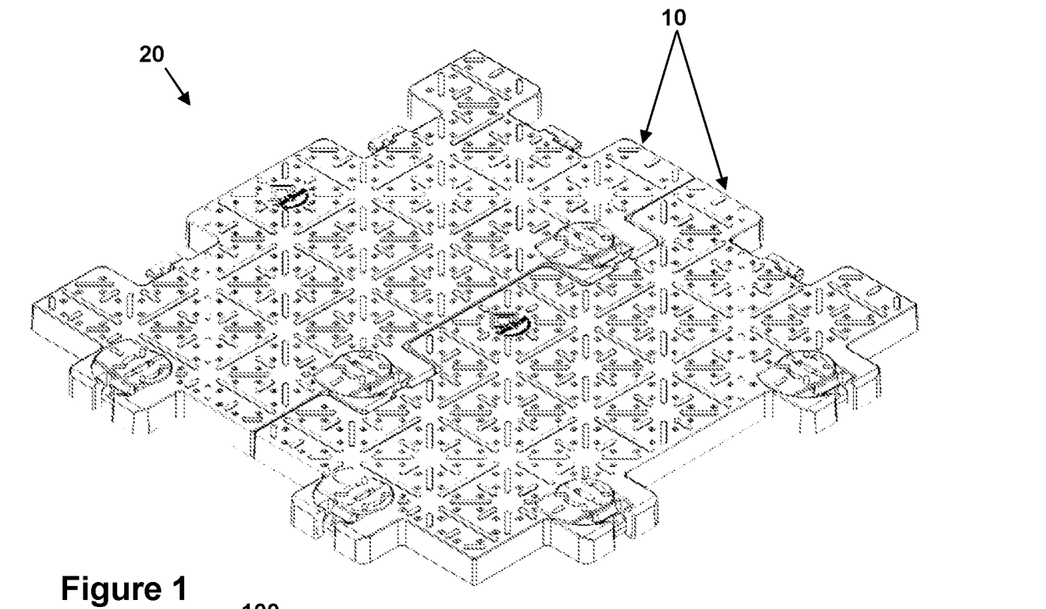
FIG. 1 is a perspective view of a flooring system comprising a plurality of flooring elements according to an embodiment of the invention, each flooring element comprising a body and a retainer connectable to the body.

FIG. 1 illustrates first and second flooring elements 10 according to the invention. The flooring elements 10 are part of a flooring system 20 comprising a plurality of flooring elements 10 that be connected to provide a temporary flooring surface.

Each flooring element 10 comprises a body 12. In this example the body 12 defines a substantially flat panel, though other body shapes are possible, particularly for accessory elements. The body 12 defines a horizontal surface, in this case a floor surface 14 that faces upward when the flooring element 10 is arranged for use on a ground surface.

Figure 2:
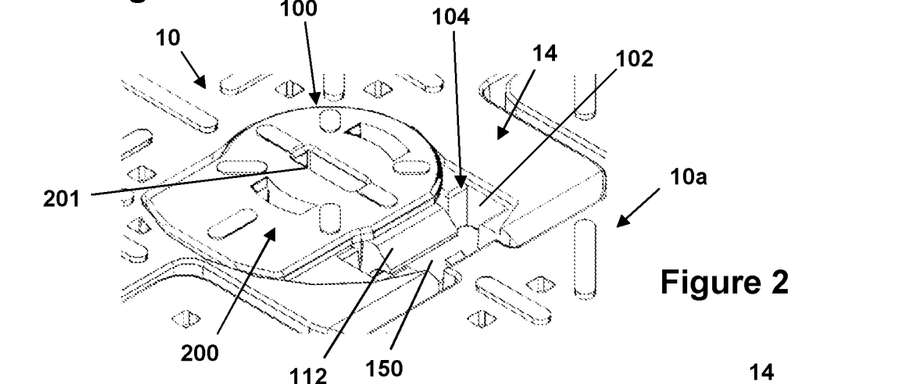
FIG. 2 is a partial perspective view of a flooring element of the flooring system of FIG. 1 with the retainer in an open position.

As best seen in FIG. 2, the flooring element 10 comprises a female connector 100. The female connector 100 comprises a connector recess 102 which opens into the floor surface 14 to define a connector opening 104 in the floor surface 14. In the region of the female connector 100 the floor surface 14 therefore defines horizontal connector surface 14a, and the connector recess 102 opens into the connector surface 14a. The connector opening 104 therefore provides access to the connector recess 102 in a vertical direction through the connector surface 14a: in this case from above.

An adjacent flooring element 10a comprises a male connector 150. The male connector 150 is shaped such that it can be received in the connector recess 102, and such that it can enter the connector recess 102 through the connector opening 104.

According to the invention the flooring element 10 also comprises a retainer 200. The retainer 200 is connectable to the body 12 (and in FIGS. 1 and 2 is shown connected to the body) in such a way that allows for movement of the retainer 200 between open and closed positions while the retainer 200 remains connected to the body 12. In the closed position, shown in FIG. 3, the retainer is configured to restrain movement of the male connector 150, to guard against the male connector 150 exiting the connector recess 102 through the connector opening 104. In the open position, shown in FIG. 2, the retainer is configured such that it does not restrain movement of the male connector 150, thereby allowing the male connector 150 to enter or exit the connector recess 102 through the connector opening 104. Thus, by virtue of the retainer 200, the male connector 150 can be held particularly securely in the female connector 100.

The retainer 200 is optionally provided with a tool-engaging means 201, here in the form of a slot or elongate aperture, so that a tool can be used to move the retainer 200 between the closed and open positions. The possibility of using a tool makes movement of the retainer 200 even easier, and can allow a user to move the retainer 200 easily from a distance above the floor surface 14. Use of the tool also means that a relatively high force must be applied to the retainer 200 to move the retainer 200 between open and closed positions, typically a higher force than can be easily applied by hand. As a result, the retainer 200 cannot be easily dislodged from its closed position during normal use of the flooring.

The retainer 200 can restrict movement of the male connector 150 in two different ways.

Firstly, as is visible in FIG. 2, the female connector 100 comprises a connector latch 112 that is configured to engage the male connector 150 when the male connector 150 is received in the connector recess 102. The male connector 150 can be disengaged from the connector latch 112 by moving the connector latch 112 to permit disengagement: this may be achieved for example by twisting the male connector 150 upwards. As will be described in more detail below, the retainer 200 is configured to restrict movement of the connector latch 112 when the retainer 200 is in the closed position, to prevent the male connector element 150 disengaging from the connector latch 112. Thus, the retainer 200 limits movement of the male connector 150 by limiting movement of the connector latch 112.

Figure 3:
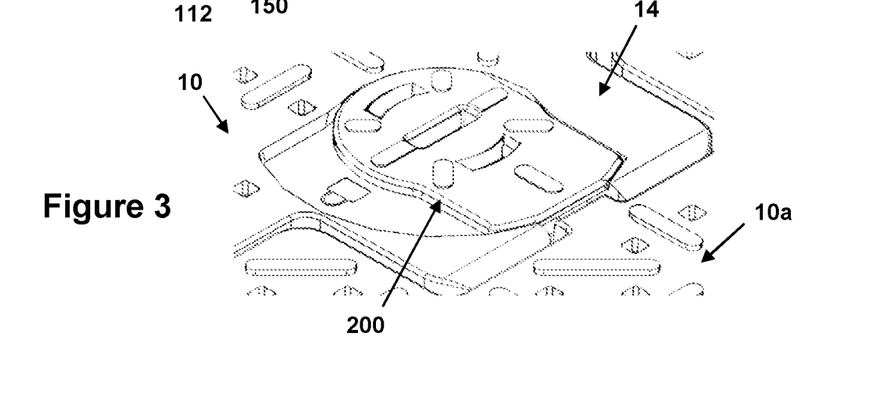
FIG. 3 is a partial perspective view of a flooring element of the flooring system of FIG. 1 with the retainer in a closed position.
Figure 4:
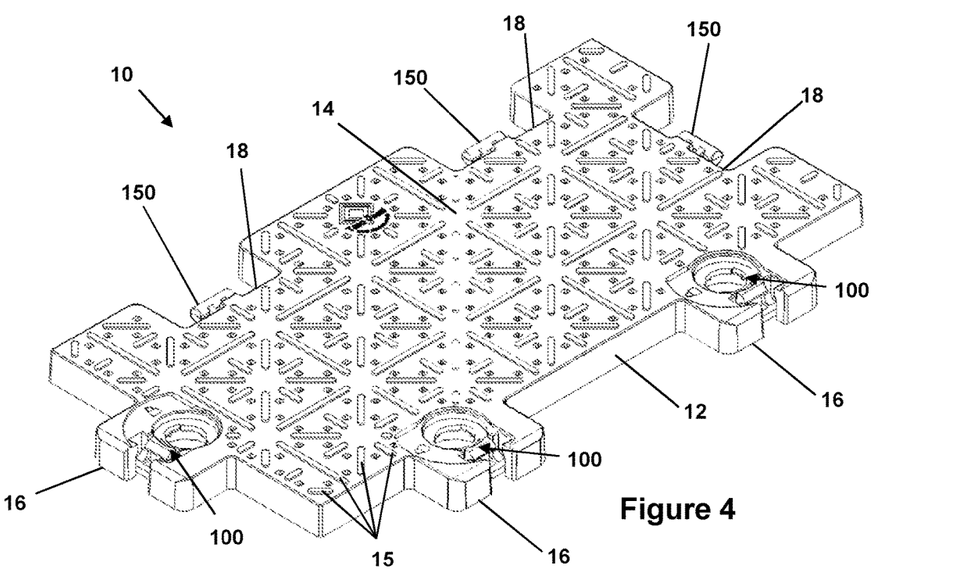
FIG. 4 is a perspective view of a body forming part of the flooring element of FIG. 1.

Secondly, as clearly visible in FIGS. 2 and 3, the retainer 150 can cover over the connector recess 102 and the connector opening 104, obstructing the connector opening 104 so that the male connector 150 is restricted from exiting through the connector opening 104. This also avoids the potential hazard that might otherwise result from having an open recess in a floor surface.

Considering the body 12 of the floor element 10 in more detail, and referring to FIGS. 4 to 8, the body 12 defines a generally flat panel that is formed from a shell. The shell is made from any suitable material, for example a plastics material such as polypropylene. An upper surface of the body 12 defines the floor surface 14, which extends in a horizontal plane when the floor element 10 is in use. The floor surface 14 is provided with grip features 15 that improve the grip performance, and advantageously the grip features extend in different directions to provide grip in all directions. In particular, the grip features are elongate raised formations with roughened surfaces, which extend in all directions at 45 degrees to each other.

The body 12 is generally rectangular. Around its edges, the body 12 comprises rectangular projection regions 16 that support the female connectors 100, and rectangular indent regions 18 that support the male connectors 150. In this way, adjacent flooring elements 10 will tesselate, with the rectangular projection regions 16 of one flooring element 10 extending into the rectangular indent regions 18 of an adjacent flooring element 10, allowing the male and female connectors 150, 100 to engage. Arranging the male connectors 150 in the indent regions 18 in this way offers protection to the male connectors 150 during transportation and storage.

Figures 5, 6:
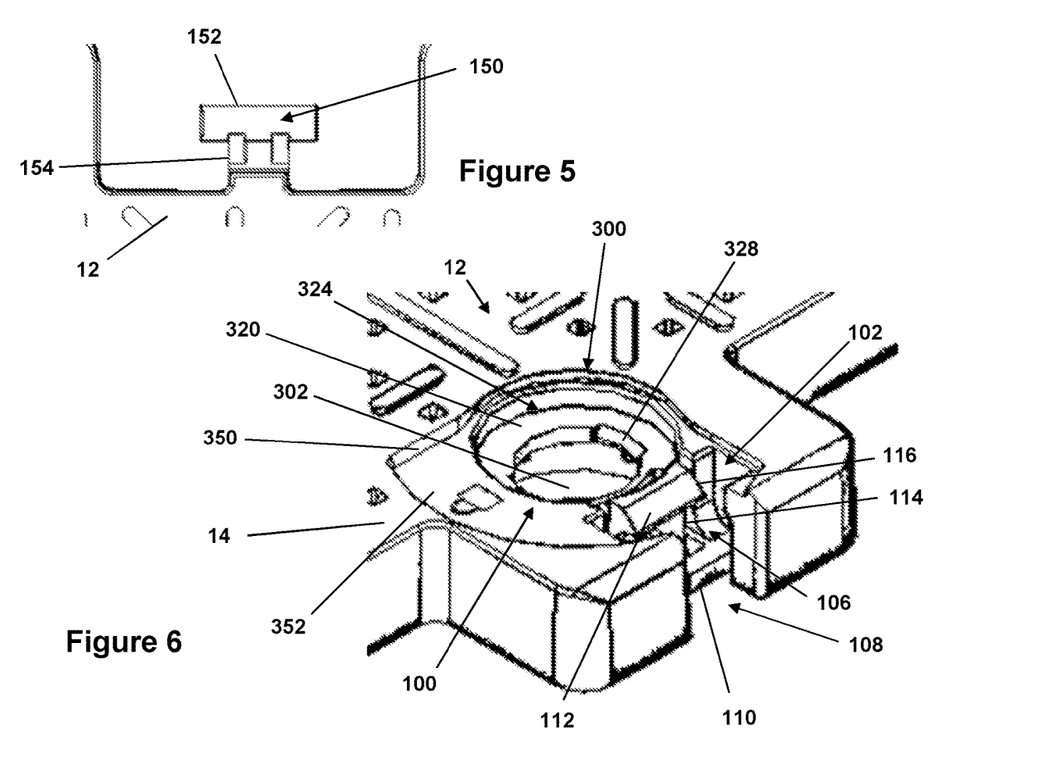
FIG. 5 is a partial plan view of a male connector forming part of the body of FIG. 4.
FIG. 6 is a partial perspective view of a female connector forming part of the body of FIG. 4.

Considering the male connector 150 in more detail, and referring to FIG. 5, the male connector 150 is generally T-shaped, comprising a bar 152 and a stem 154 that joins the bar 152 to the body 12. The bar 152 is substantially cylindrical so that the male connector 150 can act as a hinge.

Figure 7:
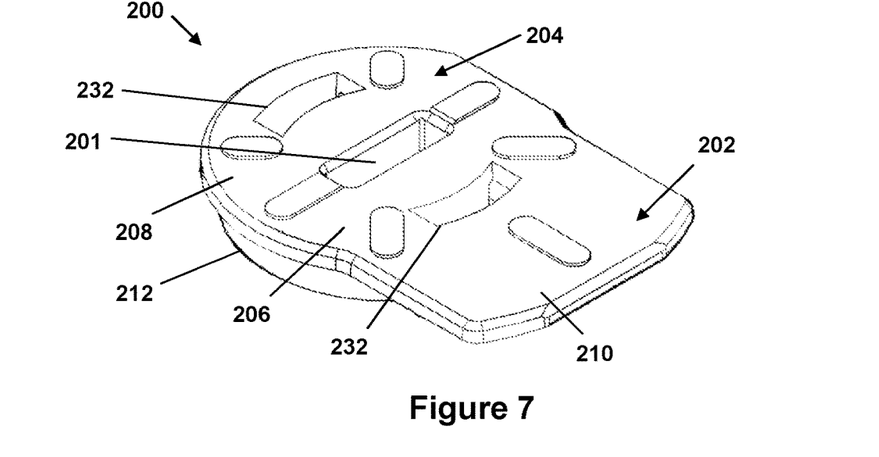
FIG. 7 is a perspective view of a retainer forming part of the flooring element of FIG. 1.

Considering the female connector 100 with reference to FIGS. 6 and 7, the recess 102 of the female connector 100 is shaped to accommodate the T-shaped male connector 150.

The recess 102 is therefore substantially T-shaped, having dimensions slightly larger than the dimensions of the male connector 150. The recess comprises a main recess region 106 that accommodates the bar 152 of the male connector 150 and a neck region 108 that accommodates the stem 154 of the male connector 150. The neck region 108 extends all the way through the body 12 from top to bottom, and opens onto an edge of the body 12. The main recess region 106 opens onto the floor surface 14, but is closed at its base 110, such that the main recess region 106 does not extend all the way through the body 12.

The main recess region 106 accommodates a connector latch 112 that is configured to engage the male connector 150. The connector latch 112 comprises a stem 114 that extends upwardly from the base 110 of the main recess region 106 to provide a spring element or cantilever, and a cap 116 at the end of the stem 114 which, in use, extends over the bar 152 of the male connector 150.

The stem 114 defines a connector-facing surface 114*a* that faces towards the connector recess 102 and hence faces towards the male connector 150. The stem 116 is shaped such that the connector-facing surface 114*a* of the stem 114 is sloped backward moving from the base 110 of the recess 104 towards the cap 116. This defines a thinned region of the stem 114 beneath the cap 116 In this way, in an upper portion of the stem 114, in the region adjacent to the male connector 150, the connector-facing surface 114*a* is spaced further back than in a lower portion of the stem 114 nearer the base 110. This provides a small spacing between the male connector 150 and the stem 114, which allows some tolerance in the positioning of the male connector 150 relative to the stem 114. This is particularly beneficial in hot weather, as the spacing can accommodate expansion of the flooring element 10, which guards against buckling of the assembled flooring.

The cap 116 is generally wedge-shaped. A lower surface 118 of the cap 116 provides an abutment surface, such that if an attempt is made to lift the male connector 150 out of the recess 102, the male connector 150 will abut against the abutment surface, hindering its movement out of the recess 102. An upper surface 120 of the cap 116 is ramped or sloped downwardly towards the recess 102. This slope facilitates passage of the bar 152 over the cap 116 and into the recess 102 when the male connector 150 is lowered onto the recess 102. A rear surface 122 of the cap 116 is substantially vertical. Pushing on the rear surface 122 of the cap 116 pushes the connector latch 112 further into engagement with the male connector 150.

Adjacent to the female connector 100, and specifically in-board of the female connector 100 with respect to the edge of the body 12 is a retainer-receiving region 300. In use, the retainer-receiving region 300 accommodates the retainer 200, and in particular accommodates it so that the retainer 200 lies flush with the floor surface 14 of the body 12.

Before describing the retainer-receiving region 300, the retainer 200 will be described in more detail.

Figure 8:
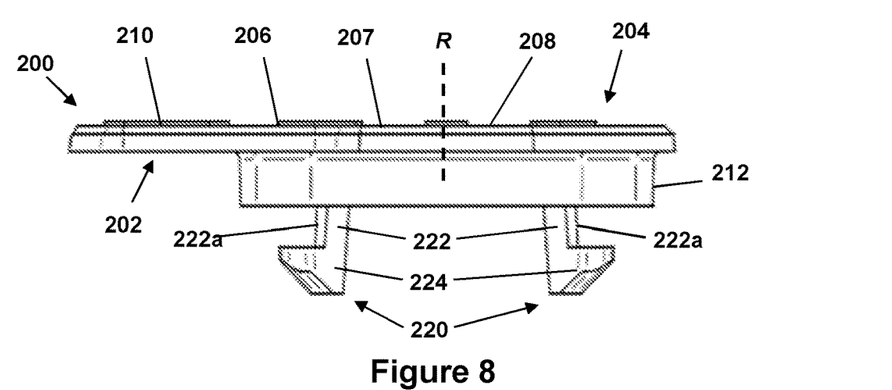
FIG. 8 is a side view of the retainer of FIG. 7.
Figure 9:
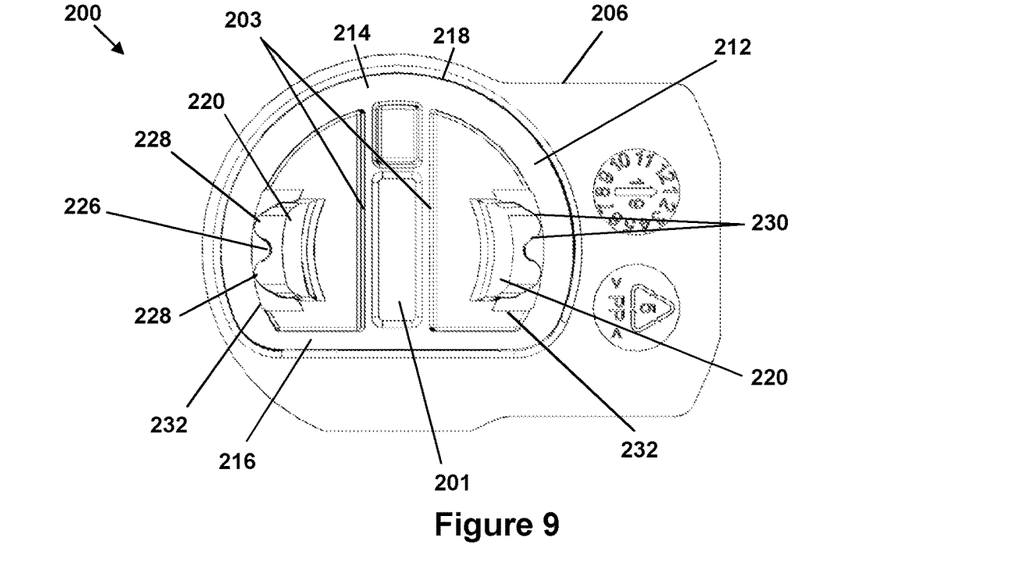
FIG. 9 is an underside view of the retainer of FIG. 7.

Referring to FIGS. 7 to 9, the retainer 200 is a piece that is separate from, but connectable to the body 12. The retainer comprises a body that can be made from any suitable material, for example from a plastics material such as polypropylene, and may be made by any suitable method, for example by injection moulding.

The retainer 200 comprises an obstruction portion 202 for obstructing the opening, and a body connection portion 204 for connecting the retainer 204 to the body 12. A plate 206 defines a root portion 208 and also comprises a projecting portion 210 that projects away from the root portion 208 to define the obstruction portion 202. When the plate 206 is horizontal, the body connection portion 204 depends downwardly from the root portion 208, while the obstruction portion 202 projects horizontally away from the root portion 208.

The plate 206 is substantially flat. An upper surface 207 of the plate 206 is provided with grip formations to improve grip performance. The slot that defines the tool-engaging means 201 is provided in the upper surface of the plate. In the embodiment shown, a reinforcement means 203 is provided on the underside of the plate 206 in the region surrounding the slot 201 (see FIG. 9). In this particular case, the reinforcement means takes the form of a reinforcing wall that surrounds the slot 201. In use, the tool can engage with the reinforcing means 203 as well as the slot 201, which guards against deformation of the slot 201.

The body connection portion 204 comprises a cam 212 in the form of a collar that projects downwardly from the root portion 208 of the plate 206. As best seen in FIG. 9, the cam 212 is annular, and is partially, though not entirely, circular in shape. The cam 212 acts as a rotation shaft to facilitate rotation of the retainer 200 between the open and closed positions of FIGS. 2 and 3. The cam 212 is therefore centred around a rotation axis R. The tool engaging means 201 is provided in the plate 206 at the location where the rotation access R passes through the plate 206, so as to provide torque at the rotation axis.

Considering the shape of the cam 212 in more detail, the cam 212 comprises a first portion or arcuate portion 214 that defines a segment of a circle, and a second portion or liner portion 216 that truncates the arcuate region 214 to define a chord of the circle. In the arcuate portion, an outer wall of the cam 212 is spaced at a first radial distance from the rotation axis. In the linear portion 216, the outer wall is spaced at a second radial distance from the rotation axis, the first radial distance being greater than the second radial distance.

An external surface 218 of the arcuate region 214 thereby defines a blocking surface that, in use, and when the retainer 200 is in the closed position, will align with, and push against, the rear surface 122 of the cap 116 of the connector latch 112. Specifically, a region of the arcuate portion 214 that is adjacent to the obstruction portion 202 will form the blocking surface, since this region will be generally directed towards the connector latch 212 when the retainer 200 is in the closed position. This encourages engagement of the connector latch 112 with the male connector 150, and blocks any disengaging movement of the connector latch 112, thereby preventing disengagement of the connector latch 112 from the male connector 150.

By contrast, when the retainer 200 is in the open position, the linear region 216 of the cam 212, which is arranged to lie at 90 degrees to the obstruction portion 202, will align with the connector latch 112. Because the linear region 216 is at a lesser radial spacing from the rotation axis R than the annular region 214, the linear region 216 will not reach, and thus will not push against, the connector latch 112. Thus, when the retainer 200 is in the open position, the connector latch 112 can be disengaged from the male connector 150 to permit separation of adjacent flooring elements 10.

The body connection portion 204 also comprises engagement means 220 to engage a corresponding engagement means on the body 12 when the body 12 and retainer 200 are connected. In this example, the body connection portion 204 is provided with two such engagement means 220, best seen in FIGS. 8 and 9, although in other embodiments only one engagement means may be used.

Each engagement means 220 comprises an elongate member 222 that extends downwardly from the root portion 208 of the retainer 200, and a latch 224 provided at the end of the elongate member 222. The elongate member 222 acts as a spring arm or cantilever to allow movement of the latch 224 for engagement and disengagement. The latch 224 defines a detent 226 arranged between two shoulders 228. In use, as will be described later, the detent 226 engages with different engagement means on the body 12 to connect the retainer 200 to the body 12, and to hold the retainer in either the open or closed position. Sides 230 of the detent 226 are ramped or sloped so as to allow the corresponding engagement means on the body 12 to pass into and out of the detent 226 when sufficient force is applied.

In the embodiment shown, each elongate member 222 meets the plate 206 at a junction point, and the plate 206 is provided with an arcuate opening 232 adjacent to each junction point. More specifically, each arcuate opening 232 extends radially between the junction point and an inner perimeter of the cam 212. The opening 232 assists with the spring function of the elongate member 222, and also assists with moulding in the event that the retainer 200 is made by injection moulding.

In the embodiment shown, the engagement means 220 are arranged such that one of the engagement means 220 are aligned with the obstruction portion 202 of the plate 206. However, other arrangements are envisaged.

Figure 10:
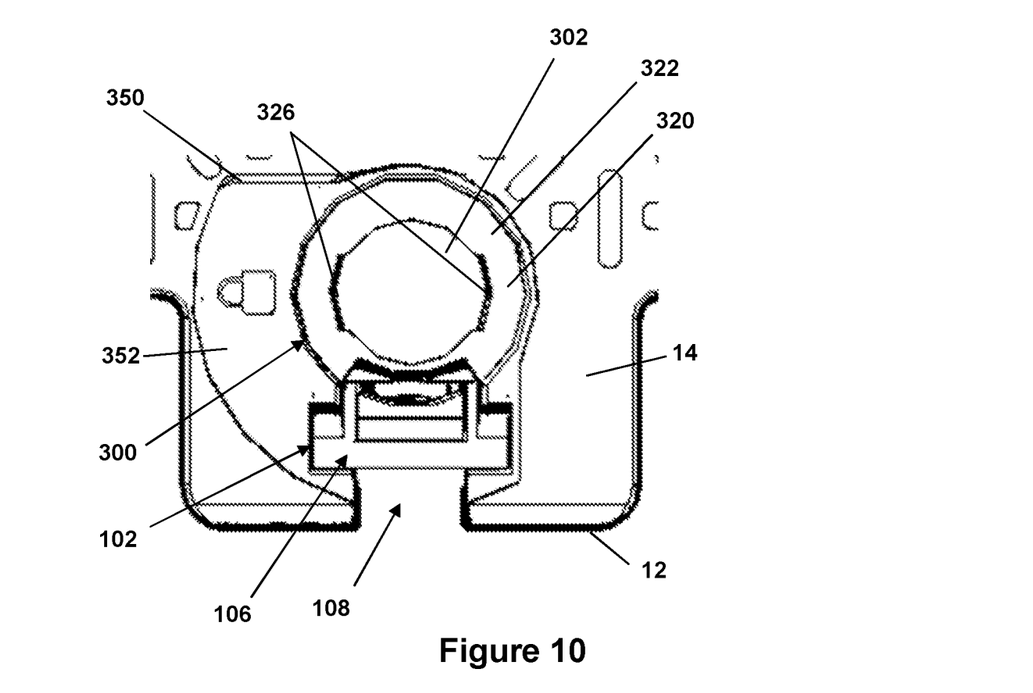
FIG. 10 is a partial top view of the body of FIG. 4 in the region of a retainer-receiving region that receives the retainer of FIG. 7.
Figure 11:
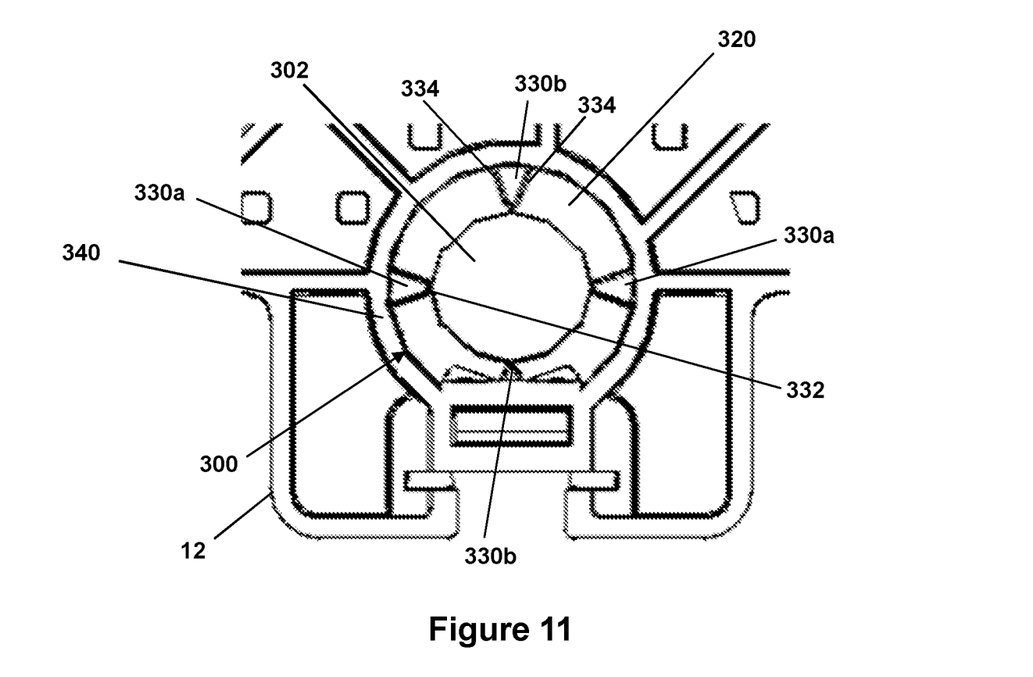
FIG. 11 is a partial underside view of the body of FIG. 4 in the region of the retainer-receiving region of FIG. 10.

Turning now to the retainer-receiving region 300, and referring to FIGS. 6, 10 and 11 in particular, the retainer-receiving region 300 comprises a retainer opening 302 in the body 12 through which the elongate members 222 of the retainer 200 extend, a flange 320 surrounding the opening 302 for accommodating the cam 212 of the retainer 200, and a recessed region 350 for accommodating the obstruction portion 202 of the retainer 200.

The retainer opening 302 is defined by a substantially circular opening in the body 12. In use, the elongate members 222 extend through the retainer opening 302. The retainer opening 302 therefore has a diameter that is substantially the same as a spacing between outward-facing surfaces 222a of the elongate members 222.

The retainer opening 302 is at least partially surrounded by an inwardly-projecting flange 320. An upward-facing surface 322 of the flange is inset from the floor surface 14 (i.e. it is lower than the floor surface 14 when the flooring element 10 is arranged for use). The flange 320 defines a shoulder region 324 between the upward-facing surface 322 and the floor surface 14. A diameter of the flange 320 is substantially equal to a diameter of the cam 212, and a width of the flange 320 is at least equal to a width of the cam 212. In this way, the shoulder region 324 is shaped to accommodate the cam 212 when the retainer 200 is connected to the body 12.

Two notches 326 are formed in the edge of the flange 320, adjacent to the retainer opening 302. The notches 326 provide regions of the opening 302 that are of slightly increased diameter, and are configured to present a ramped or sloped upward-facing surface 328. The notches have a circumferential width that is approximately the same as, or slightly larger than, the width of the latches 224 on the retainer 200, and are positioned to align with the latches 224. In this way, the latches 224 can pass easily over the ramped surfaces 328 of the notches 326 to allow the latches 224 and elongate members 222 to pass through the opening 302.

FIG. 11 shows the underside of the retainer-receiving region 300 of the body 12, facing away from the shoulder region, and reveals that the underside of the flange 320 is provided with engagement means 330 for engaging with the corresponding engagement means 220 of the retainer 200 (i.e. the latches 224, and in particular the detent 226 on the latches 224).

The engagement means 330 take the form of projections. Each projection is generally triangular in shape, pointing radially towards the centre of the retainer opening 302. In this way, each projection defines a blunted point 332 and sloped edges 334 that slope outwardly away from the point 334 moving away from the retainer opening 302. The flange 320 provides reinforcement to the projections 330, improving the wear resistance of the projections 330.

In this example, the underside of the flange is provided with a plurality of engagement means: a set of first engagement means 330a, comprising two projections arranged opposite each other, and a set of second engagement means 330b, also comprising two projections arranged opposite each other.

The first engagement means 330a and the second engagement means 330b are circumferentially separated from each other around the flange 320. In this case, the first and second engagement means 330a, 330b are separated from each other by 90 degrees.

The first and second engagement means 330a, 330b are also arranged such that when the latches 224 of the retainer 200 are engaged with the first engagement means 330a, the retainer 200 is in the open position, and when the latches 224 of the retainer 200 are engaged with the second engagement means 330b, the retainer 200 is in the closed position. In this way, the co-operating engagement means 220, 330, on the retainer 200 and the body 12 can hold the retainer 200 securely in both the open and closed positions. Holding the retainer 200 securely in the closed position is important to ensure that the male connector 150 is safely secured in the female connector 100 when the flooring element 10 is connected to an adjacent element for use, and cannot be forced vertically apart. Holding the retainer 200 securely in the open position is important to ensure that the retainer 200 stays in the open position during transportation of the flooring elements 10, so that the retainer 200 is already in the open position when the flooring element 10 comes to be installed for use.

As is also visible is FIG. 11, on an underside of the body 12, the flange 320 is surrounded by a reinforcing element 340. In this example, the reinforcing means takes the form of an annular wall that surrounds the flange 320, and depends downwardly from the flange 320 through the depth of the body 12. When the element 10 is arranged for use, the reinforcing element 340 can rest on the ground, providing resistive upward forces in the retainer-receiving area 300.

The retainer-receiving area 300 also comprises a recessed region 350 that at least partially surrounds the shoulder region 324 defined by the flange 320. The recessed region 350 defines a base surface 352 that is inset from the floor surface 14 of the body 12 (i.e. that is below the floor surface 14 when the element 10 is arranged for use). A depth of the recessed region 350 is substantially the same as a depth of the plate 206 of the retainer 200.

A footprint of the recessed region 350 is shaped so as to accommodate the plate 206 when the retainer 200 is in both the open and closed positions. The footprint of the recessed region 350 is therefore defined by a sweep of the plate 206 as the plate 206 moves from the open position to the closed position. In this way, the recessed region 350 defines a path for the plate 206, and particularly for the obstruction portion 202, between the open and closed positions. The path leads towards the connector opening 204 and connector recess 202, such that the connector opening 204 and connector recess 202 are located substantially at the terminus of the path, and connector opening 204 opens into the base surface 352 of the recessed region 350.

Methods of assembly and use of the flooring element 10 in a flooring system will now be described.

To ready the flooring element 10 for use, if the retainer 200 is not already connected to the body 12, the retainer 200 and the body 12 are first connected. This is preferably completed at the point of manufacture, or at a later point before the flooring element 10 is transported to a site for use, but it could also be completed at an on-site location.

To engage the retainer 200 in the body 12, the latches 224 of the retainer 12 are aligned with the notches 326 in the flange 320 of the body 12. Pressure is then applied to the plate 206, which pushes the latches 224 over the ramped surface 328 of the notch 326, and through the retainer opening 302.

Figure 12:
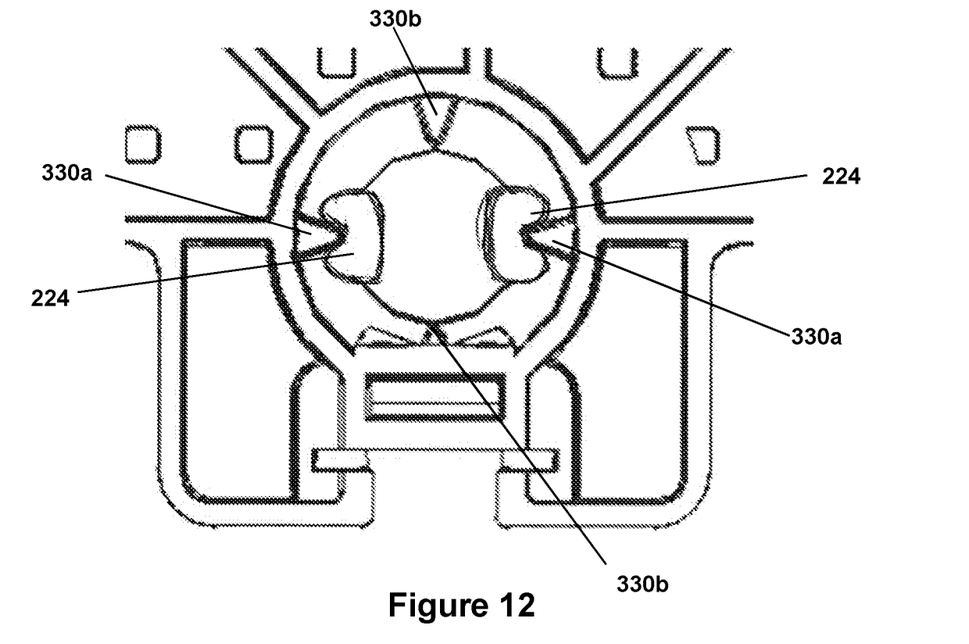
FIGS. 12 and 13 are partial underside views of the retainer-receiving region of FIG. 11, showing an engagement feature of the retainer engaged with an engagement feature of the body, with the retainer in the open and closed positions respectively.

Because the notches 326 are aligned with the protrusions that form the first engagement means 330a on the body 12, as the latches 224 move through the retainer opening 302, they move into engagement with the first engagement means 330a. The retainer 200 is thereby secured in place connected to the body 12 and secured in the open position, ready for use. This arrangement is shown from the underside in FIG. 12, which shows the latches 224 engaged with the protrusions of the first engagement means 330a When the flooring element 10 is installed in a flooring system, the male connector 150 of an adjacent flooring element is moved vertically into the connector recess 102 through the connector opening 104. The male connector element 150 is initially arranged to rest on top of the upper surface 120 of the cap 116 of the connector latch 112. A downward vertical force is applied so that the latch moves rearward, allowing the male connector element 150 to pass into the connector recess 102.

With the male connector element arranged in the connector recess 102 and engaged with the connector latch 112, the retainer 200 is then moved from the open position to the closed position.

A tool, such as a flat-head screwdriver, is arranged in the slot that defines the tool-engaging feature 201. A rotational force is applied to the tool, which in turn applies a rotational force to the retainer 200. The rotational force causes the latches 224 of the retainer 200 to disengage from the protrusions on the underside of the flange 320 that form the first engagement means 330a, and the retainer 200 begins to rotate about the cam 212 about the rotation axis R. As the retainer rotates about the cam 212, the obstruction portion 202 traces a path around the recessed region 350 on the body 12.

As the retainer 200 moves between the open and closed positions, movement occurs only in a movement plane that is horizontal i.e. parallel to the floor plane. Said another way, each point on the retainer 200 moves only horizontally as the retainer 200 moves from the open to the closed position and vice versa.

Figure 13:
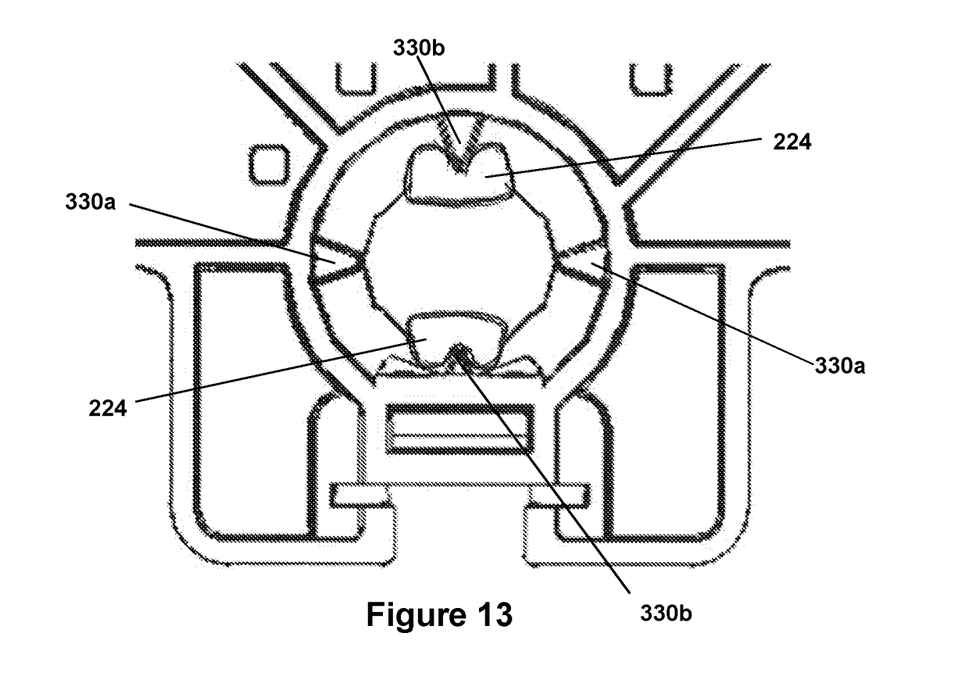

As rotation continues, the latches 224 eventually reach the protrusions that define the second engagement means 330b on the body 12. The latches 224 are pushed into engagement with the second engagement means 330b with a snap-fit, indicating clearly to the user that the retainer 200 has been successfully locked into the closed position. This arrangement is shown from the underside in FIG. 13, which shows the latches 224 engaged with the protrusions of the second engagement means 330b.

In the closed position, the obstruction portion 202 of the retainer 200 covers the connector opening 104. The plate 206 of the retainer 200 is fully accommodated in the recessed region 350, so that an upper surface of the plate 206 remains flush with the floor surface of the body 12.

Figure 14:
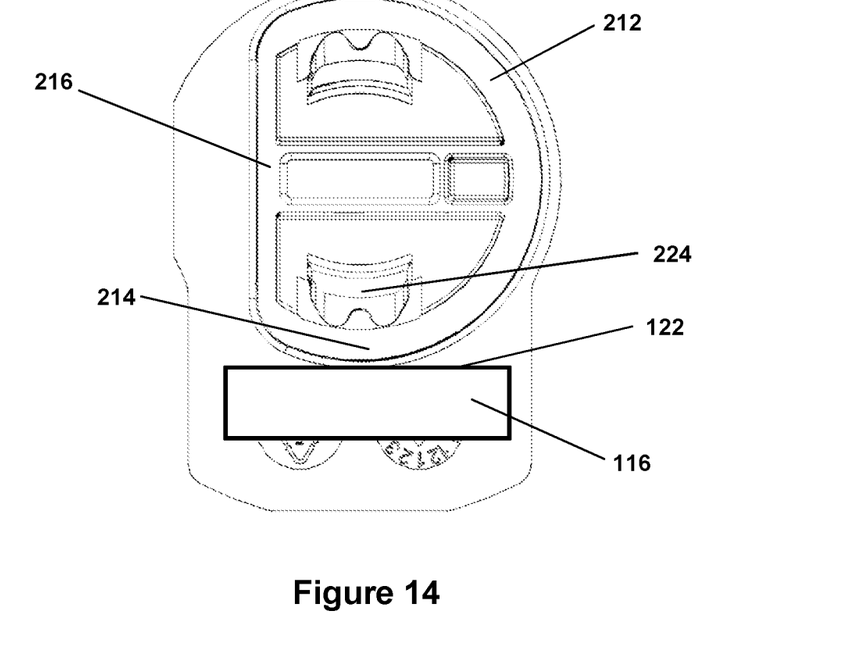
FIGS. 14 and 15 are schematic views showing an underside of the retainer of FIG. 7 relative to the location of a connector latch provided in the female connector of FIG. 6, with the retainer in the closed and open positions respectively.

FIG. 14 shows schematically the relative positions of the retainer 200 and the cap 116 of the connector latch 112 when the retainer 200 is in the closed position. As can be seen in FIG. 14, in the closed position, the arcuate region 214 of the cam 212 sits against the rear surface 122 of the cap 116 of the connector latch 112. In this way, the cam 212 applies a slight closing force to the connector latch 112, restricting movement of the connector latch 112 in a disengaging direction away from the male connector 150. If an upward force were to be accidentally or deliberately applied to the male connector 150 with the retainer 200 in the closed position, the connector latch would be blocked from any disengaging movement by the arcuate region 214 of the cam 212, and thus movement of the male connector 150 out of the connector recess 102 is restricted by the retainer 200. Movement of the male connector 150 out of the connector recess 102 is further restricted by the obstruction portion 202 of the retainer 200, which obstructs the connector opening 104.

To permit disengagement of the connector latch 112 from the male connector 150, and movement of the male connector 150 out of the connector recess 102 via the connector opening 104, the retainer 200 must first be moved back to the open position, using the tool to apply a reverse torque. The retainer 200 is rotated until the latches 224 engage with the first engagement means 330a, and the retainer 200 is locked in the open position once more.

Figure 15:
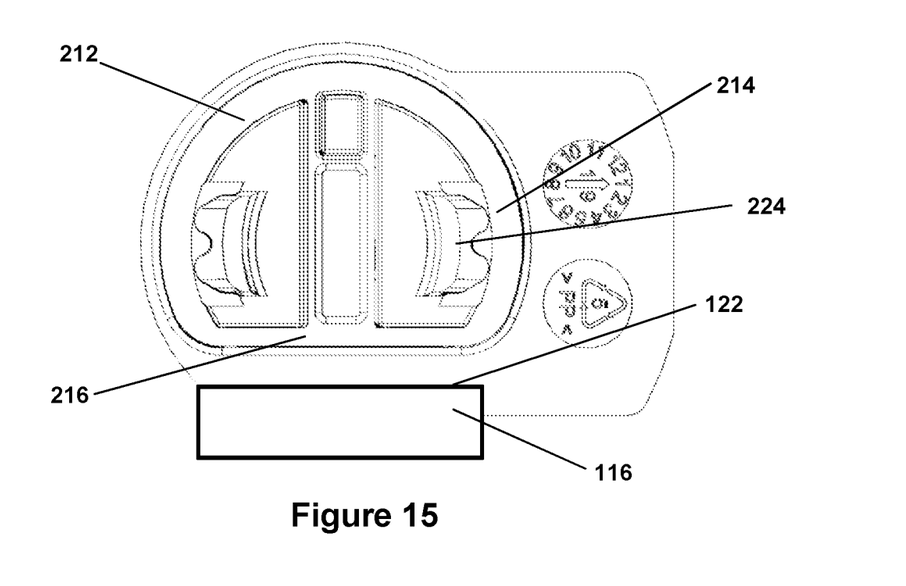

FIG. 15 shows schematically the relative positions of the retainer 200 and the cap 116 of the connector latch 112 when the retainer 200 is in the open position. As can be seen in FIG. 15, When the retainer 200 moved into the open position, the obstruction portion 202 of the retainer 200 will no longer cover the connector opening 104. When in the open position, the linear region 216 of the cam 212 sits adjacent to, but spaced apart from, the rear surface 122 of the cap 116 of the connector latch 112. In this way, the cam 212 no longer restricts movement of the connector latch 112 in the disengaging direction. Thus, an upward force can be applied to the male connector 150 to cause the male connector to disengage from the connector latch 112, and to remove the male connector 150 from the connector recess 102 via the connector opening 104, thereby allowing disconnection of adjacent flooring elements and hence disassembly of the floor system. Conveniently, the retainer 200 is left locked in the open position, ready for re-use in the future.

Thus, the retainer can be quickly and easily moved between open and closed positions. By configuring the retainer for engagement with a tool, there is no need for a user to bend over in close proximity with the ground when installing the flooring: instead, the user can move the retainer from a position above the ground. There is also no need for the user to find and install any separate component to the body of the flooring element, because the retainer is already connected to the body in both the open and close positions. As a result the flooring system can be installed quickly, efficiently, and with minimal ergonomic impact to the user.

If desired, the retainer 200 can be removed from the body 12 by pinching the latches 224 together to allow the latches 224 to pass through the retainer opening 302. It is generally preferred that the retainer 200 remains in place between uses, locked in the open position, so that it is ready for use. However, if the retainer 200 becomes damaged or worn, it may be desirable to remove and replace the retainer 200.

In the embodiment described, the connector surface is defined by the floor surface of the flooring element. However, embodiments are also envisaged in which the connector surface is provided on the base of the flooring element, so that the female connector faces downwards in use, and is lowered over the male connector to connect the flooring elements.

In the embodiment described, the retainer uses two mechanisms to restrict movement of the male connector: however each mechanism may also be used in isolation from the other.

In the embodiment described the retainer can be connected to, and disconnected from, the body of the flooring element (i.e. the retainer is removably connected to the body), which can be particularly advantageous to allow for replacement of the retainer if it is damaged or worn. However, embodiments are also envisaged in which the retainer is not removable from the body, or is removable only with specific tooling.

The body of the flooring element described above is defined by a substantially rectangular shell, but the body may take any suitable shape. The body may be hollow, or solid, and may be open or closed on its lower surface. Reinforcing members may be provided if the body is hollow. The body and retainer may be made of any suitable material and are not limited to a plastics material or polypropylene.

The flooring element described above comprises both male and female connectors. However, the flooring elements may comprise only a female connector. This may be particularly the case for an edge element, or an accessory element such as a ramp element. Other flooring elements may comprise only a male connector.

Other variations and modifications will be apparent to the skilled person that are within the scope of the appended claims.

The invention claimed is:

1. A flooring element for connection to other elements in a flooring system, the flooring element comprising:
   a body defining a connector surface that is substantially horizontal and upward-facing when the flooring element is laid on a ground surface;
   a female connector comprising a connector recess suitable for receiving a male connector of another flooring element of the flooring system, the connector recess defining a connector opening in the connector surface, such when the flooring element is laid on a ground surface, a male connector of another flooring element in the system is lowered into the connector recess from above to engage with the female connector; and
   a retainer connectable to the body such that, while connected, the retainer is movable between:
      a closed position in which the retainer is arranged to restrict movement of the male connector, to guard against the male connector exiting the connector recess through the connector opening; and
      an open position in which the retainer does not restrict movement of the male connector, thereby permitting the male connector to exit the connector recess through the connector opening;
   wherein the retainer comprises an obstruction portion configured such that when the retainer is in the closed position the connector opening is obstructed by the obstruction portion to restrict movement of a male connector when housed in the recess, and when the retainer is in the open position, the connector recess is unobstructed by the obstruction portion so that the retainer does not restrict movement of the male connector when housed in the recess.

2. The flooring element of claim 1, wherein the retainer is configured to move between the open and closed positions in a movement plane that is substantially horizontal.

3. The flooring element of claim 1, wherein the retainer is configured to move between the open and closed positions by rotation about a rotation axis perpendicular to the horizontal plane.

4. The flooring element of claim 1, wherein the retainer comprises a tool-engaging feature for engaging a tool to facilitate movement of the retainer between the open and closed positions.

5. The flooring element of claim 1, wherein the connector recess comprises a connector latch for engaging the male connector to prevent the male connector from exiting the connector recess through the connector opening, and wherein the retainer is configured to restrict movement of the connector latch when the retainer is in the closed position to prevent the male connector disengaging from the connector latch, thereby limiting movement of the male connector.

6. The flooring element of claim 1, wherein the retainer comprises a body connection portion for connecting the retainer to the body.

7. The flooring element of claim 6, wherein the retainer is configured to move between the open and closed positions by rotation about a rotation axis perpendicular to the horizontal plane, and wherein the body connection portion comprises a cam centred on the rotation axis.

8. The flooring element of claim 7, wherein the connector recess comprises a connector latch for engaging the male connector to prevent the male connector from exiting the connector recess through the connector opening, and wherein the retainer is configured to restrict movement of the connector latch when the retainer is in the closed position to prevent the male connector disengaging from the connector latch, thereby limiting movement of the male connector, and wherein the cam is configured to restrict movement of the connector latch when the retainer is in the closed position.

9. The flooring element of claim 8, wherein the cam comprises an outer wall having a first portion spaced at a first radial distance from the rotation axis, and a second portion spaced at a second radial distance from the rotation axis, the first radial distance being greater than the second radial distance, such that the cam is configured to be positioned adjacent to the connector latch, and configured to push on the connector latch, when the retainer is in the closed position, and is configured to be spaced apart from the connector latch when the retainer is in the open position.

10. The flooring element of claim 6, wherein the body connection portion comprises engagement means configured to engage a corresponding engagement means on the body when the body and retainer are connected, wherein the engagement means on the body connection portion comprises a latch defining a detent, and wherein the engagement means on the body comprises a corresponding protrusion for engaging with the detent.

11. The flooring element of claim 10, wherein the engagement means on the body connection portion comprises an elongate portion with the latch arranged at an end of the elongate portion.

12. The flooring element of claim 10, wherein the body comprises a first engagement means for engaging with the engagement means on the body connection portion to secure the retainer in the open position, and a second engagement means for engaging with the engagement means on the body connection portion to secure the retainer in the closed position.

13. The flooring element of claim 12, wherein the retainer is configured to move between the open and closed positions by rotation about a rotation axis perpendicular to the horizontal plane, and wherein the first and second engagement means on the body are circumferentially displaced about the rotation axis.

14. The flooring element of claim 12, wherein the body comprises a retainer opening through which the engagement means of the body connection portion extend to reach the corresponding engagement means of the body.

15. The flooring element of claim 7, wherein the retainer opening is at least partially surrounded by an inwardly-projecting flange that is inset from the connector surface to define a shoulder region, the shoulder region being shaped to accommodate the cam when the retainer is connected to the body.

16. The flooring element of claim 1, wherein the retainer comprises a plate, the plate having a root portion and a projecting portion, the projecting portion defining the obstruction portion of the retainer, and wherein the body connection portion depends downwardly from the root portion of the plate when the retainer is connected to the body and the flooring element is arranged for use.

17. The flooring element of claim 16, wherein the body comprises a recessed region for accommodating the obstruction portion of the retainer when the retainer is in both the closed and open positions, such that the plate is substantially flush with the connector surface when the retainer is connected to the body and the flooring element is arranged for use, wherein the recessed region defines a path for the obstruction portion between the open and closed positions.

18. The flooring element of claim 1, wherein the flooring element comprises a male connector, the male connector being configured for connection to a female connector of an identical flooring element, wherein the male connector is configured to fit through the connector opening to be received in the connector recess.

19. A method of installing a flooring system, the flooring system comprising a first flooring element having a male connector and a second flooring element having a body defining a connector surface, a retainer connected to the body, and a female connector formed in the body, the female connector comprising a connector recess suitable for receiving the male connector and defining a connector opening in the connector surface, the method comprising:
  arranging the second flooring element such that the connector surface is substantially horizontal;
  with the retainer of the second flooring element in an open position in which the connector recess is unobstructed by an obstruction portion of the retainer so that movement of the male connector of the first flooring element is not restrained by the retainer: lowering the male connector into the recess of the female connector through the connector opening from a position above the connector recess; and
  moving the retainer from the open position to a closed position in which the connector opening is obstructed by the obstruction portion so that movement of the male connector is restrained by the retainer, to guard against the male connector exiting the connector recess via the connector opening.

20. A flooring system, comprising:
a first flooring element comprising a male connector; and
a second flooring element comprising:
  a body defining a connector surface that is substantially horizontal and upward-facing when the flooring element is laid on a ground surface;
  a female connector comprising a connector recess suitable for receiving the male connector of the first flooring element, the connector recess defining a connector opening in the connector surface, such when the second flooring element is laid on a ground surface, the male connector of the first flooring element is lowered into the connector recess from above to engage with the female connector; and
  a retainer connectable to the body such that, while connected, the retainer is movable between:
    a closed position in which the retainer is arranged to restrict movement of the male connector, to guard against the male connector exiting the connector recess through the connector opening; and
    an open position in which the retainer does not restrict movement of the male connector, thereby permitting the male connector to exit the connector recess through the connector opening;
  wherein the retainer comprises an obstruction portion configured such that when the retainer is in the closed position the connector opening is obstructed by the obstruction portion to restrict movement of the male connector when housed in the recess, and when the retainer is in the open position, the connector recess is unobstructed by the obstruction portion so that the retainer does not restrict movement of the male connector when housed in the recess.

* * * * *